United States Patent
Hayashima et al.

(10) Patent No.: US 9,586,576 B2
(45) Date of Patent: Mar. 7, 2017

(54) HYBRID VEHICLE CONTROL DEVICE

(71) Applicant: TOYOTA JIDOSHA KABUSHIKI KAISHA, Toyota-shi, Aichi-ken (JP)

(72) Inventors: Naoki Hayashima, Susono (JP); Koji Murakami, Susono (JP); Takaaki Tanaka, Susono (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 14/762,510

(22) PCT Filed: Jan. 16, 2014

(86) PCT No.: PCT/JP2014/050667
§ 371 (c)(1),
(2) Date: Jul. 22, 2015

(87) PCT Pub. No.: WO2014/115635
PCT Pub. Date: Jul. 31, 2014

(65) Prior Publication Data
US 2015/0360672 A1  Dec. 17, 2015

(30) Foreign Application Priority Data
Jan. 22, 2013  (JP) .................................. 2013-009257

(51) Int. Cl.
*B60W 20/10* (2016.01)
*B60W 20/00* (2016.01)
(Continued)

(52) U.S. Cl.
CPC .............. *B60W 20/10* (2013.01); *B60K 6/48* (2013.01); *B60K 6/547* (2013.01); *B60W 10/02* (2013.01);
(Continued)

(58) Field of Classification Search
CPC ......... B60K 6/48; B60K 6/547; B60W 10/02; B60W 10/06; B60W 20/00; B60W 20/10;
(Continued)

(56) References Cited

U.S. PATENT DOCUMENTS

| 8,983,697 B2* | 3/2015 | Toki | .......................... B60K 6/48 |
| | | | 701/22 |
| 2010/0248893 A1* | 9/2010 | Shimanaka | .............. B60K 6/48 |
| | | | 477/5 |

(Continued)

FOREIGN PATENT DOCUMENTS

| CN | 101850768 A | 10/2010 |
| EP | 2 287 058 A1 | 2/2011 |

(Continued)

Primary Examiner — Jerrah Edwards
Assistant Examiner — Tamara Weber
(74) Attorney, Agent, or Firm — Sughrue Mion, PLLC

(57) ABSTRACT

A control device is applied to a hybrid vehicle (1A) in which an internal combustion engine (2) and an MG (3) are connected through a second clutch (21), the MG (3) and a transmission (10) are connected through a first clutch (20) whose state is switchable by a depression operation of a clutch pedal (CP), and an output shaft (12) of the transmission (10) is connected to a driving wheel (5) so as to transmit power. The control device starts the internal combustion engine (2) when an accelerator opening is equal to or greater than a start determination value. When the vehicle (1A) is stopped and the internal combustion engine (2) is stopped, and when the amount of return of the clutch pedal (CP) is small, the control device makes the start determination value greater than when the amount of return of the clutch pedal (CP) is great.

6 Claims, 8 Drawing Sheets

(51) Int. Cl.
*B60K 6/48* (2007.10)
*B60K 6/547* (2007.10)
*B60W 10/06* (2006.01)
*B60W 30/18* (2012.01)
*B60W 10/02* (2006.01)

(52) U.S. Cl.
CPC ............ B60W 10/06 (2013.01); B60W 20/00 (2013.01); B60W 30/18027 (2013.01); *B60W 2540/10* (2013.01); *B60W 2540/14* (2013.01); *B60W 2710/021* (2013.01); *B60W 2710/06* (2013.01); *Y02T 10/6221* (2013.01); *Y10S 903/93* (2013.01)

(58) Field of Classification Search
CPC ....... B60W 30/18027; B60W 2540/10; B60W 2540/14; B60W 2710/021; B60W 2710/06; Y02T 10/6221; Y10S 903/93
See application file for complete search history.

(56) References Cited

U.S. PATENT DOCUMENTS

| | | | | |
|---|---|---|---|---|
| 2012/0265427 | A1* | 10/2012 | Petridis | B60W 10/02 701/113 |
| 2012/0292919 | A1* | 11/2012 | Suzuki | B60K 6/48 290/38 C |
| 2013/0144514 | A1* | 6/2013 | Choi | B60K 6/48 701/113 |
| 2013/0158838 | A1* | 6/2013 | Yorke | B60W 10/06 701/103 |

FOREIGN PATENT DOCUMENTS

| | | |
|---|---|---|
| JP | 2009-292313 A | 12/2009 |
| JP | 2010254014 A | 11/2010 |
| JP | 2011-037409 A | 2/2011 |

* cited by examiner

HYBRID VEHICLE CONTROL DEVICE

TECHNICAL FIELD

The present invention relates to a control device for a hybrid vehicle which is provided with a clutch operable with a clutch pedal in a power transmission path between an internal combustion engine and a driving wheel and is configured to output power from an electric motor to a power transmission path between the clutch and the driving wheel.

BACKGROUND ART

A hybrid vehicle in which an internal combustion engine and a motor generator as a drive source for traveling are mounted is known. In this hybrid vehicle, a manual clutch which is operated by a clutch pedal is provided in a power transmission path between the drive source for traveling and a driving wheel. For example, a hybrid vehicle in which a rotation shaft of the motor generator is connected to an output shaft of the internal combustion engine through an automatic clutch, and an input shaft of a manual transmission is connected to the rotation shaft of the motor generator through a manual clutch is known (see PTL 1). In the vehicle of PTL 1, when an EV driving mode in which the vehicle is allowed to travel only with motor torque of the motor generator is selected, the internal combustion engine is stopped, and the automatic clutch is released. When an accelerator opening becomes great and a requested drive force to the vehicle is increased, the internal combustion engine is started, and the driving mode is switched to another mode. In addition, PTL 2 is the prior art document relating to the invention.

CITATION LIST

Patent Literature

PTL 1: Japanese Patent Application Publication No. 2011-037409
PTL 2: Japanese Patent Application Publication No. 2009-292313

SUMMARY OF THE INVENTION

In a vehicle in which a clutch pedal is provided, a driver generally operates both the clutch pedal and an accelerator pedal in order to start the vehicle. In the vehicle of PTL 1, when the vehicle is parked in the EV driving mode, the internal combustion engine is stopped. When the vehicle is started from this state, since the internal combustion engine is stopped, the driver cannot determine to what extent the accelerator pedal is operated based on the rotation speed of the internal combustion engine or sound of the internal combustion engine. For this reason, the internal combustion engine may be unnecessarily started by strongly depressing the accelerator pedal wastefully.

Accordingly, an object of the invention is to provide a control device for a hybrid vehicle capable of suppressing the unnecessary start of an internal combustion engine at the time of the start of the hybrid vehicle.

A first control device of the invention, which is applied to a hybrid vehicle including an internal combustion engine and an electric motor as a drive source for traveling mounted therein, and a clutch configured to change the position of an engagement member with respect to an engaged member in a power transmission path between the internal combustion engine and a driving wheel according to a depression operation of a clutch pedal so as to be switchable between a full engagement state where the engagement member and the engaged member rotate integrally and power is transmitted between the internal combustion engine and the driving wheel and a full release state where the engagement member is farthest separated from the engaged member and power transmission between the internal combustion engine and the driving wheel is cut off, the internal combustion engine being separable from the driving wheel to drive the driving wheel with the electric motor, includes internal combustion engine start means for starting the internal combustion engine when a requested drive force calculated based on a driver's operation is equal to or greater than a start determination value, in which when the vehicle is stopped and the internal combustion engine is stopped, and when the amount of return of the clutch pedal from the position of the clutch pedal where the clutch is put in the full release state is smaller than a predetermined value or when the amount of movement of the engagement member moving from a position where the clutch is put in the full release state toward a position where the clutch is put in the full engagement state is smaller than a predetermined value, the start of the internal combustion engine is inhibited even when the requested drive force is the start determination value.

According to the first control device of the invention, when the amount of return of the clutch pedal is smaller than the predetermined value or when the amount of movement of the engagement member is smaller than the predetermined value, the internal combustion engine is not started even when the requested drive force is the start determination value, thus, even when the driver depresses the accelerator pedal erroneously even with the small amount of return of the clutch pedal, it is possible to suppress the start of the internal combustion engine. For this reason, it is possible to suppress the unnecessary start of the internal combustion engine at the time of the start of the vehicle. With this, it is possible to suppress deterioration of fuel efficiency. Furthermore, since it is possible to suppress the unnecessary start of the internal combustion engine, it is possible to suppress an unpleasant feeling to the driver due to starting sound of the internal combustion engine or vibration at the time of the start.

A second control device of the invention, which is applied to a hybrid vehicle including an internal combustion engine and an electric motor as a drive source for traveling mounted therein, and a clutch configured to change the position of an engagement member with respect to an engaged member in a power transmission path between the internal combustion engine and a driving wheel according to a depression operation of a clutch pedal so as to be switchable between a full engagement state where the engagement member and the engaged member rotate integrally and power is transmitted between the internal combustion engine and the driving wheel and a full release state where the engagement member is farthest separated from the engaged member and power transmission between the internal combustion engine and the driving wheel is cut off, the internal combustion engine being separable from the driving wheel to drive the driving wheel with the electric motor, includes internal combustion engine start means for starting the internal combustion engine when a requested drive force calculated based on a driver's operation is equal to or greater than a start determination value, in which when the vehicle is stopped and the internal combustion engine is stopped, and when the amount of return of the clutch pedal from the position of the clutch pedal where the clutch is put in the full release state is small or when the amount of movement of the engagement member moving from a position where the clutch is put in the full release state toward a position where the clutch is put in the full engagement state is small, the start determination value is made greater than when the amount of return of the clutch pedal is great or when the amount of movement of the engagement member is great.

According to the second control device of the invention, when the amount of return of the clutch pedal is small or when the amount of movement of the engagement member is small, the start determination value is greater than when the amount of return of the clutch pedal is great or when the amount of movement of the engagement member is great; thus, it is possible to suppress the start of the internal combustion engine. For this reason, even when the driver depresses the accelerator pedal erroneously even with the small amount of return of the clutch pedal, it is possible to suppress the start of the internal combustion engine. For this reason, it is possible to suppress the unnecessary start of the internal combustion engine at the time of the start of the vehicle. With this, it is possible to suppress deterioration of fuel efficiency. Furthermore, since it is possible to suppress the unnecessary start of the internal combustion engine, it is possible to suppress an unpleasant feeling to the driver due to starting sound of the internal combustion engine or vibration at the time of the start. On the other hand, when the driver strongly depresses the accelerator pedal intentionally, for example, when the driver starts the vehicle rapidly, the internal combustion engine is started. For this reason, it is possible to start the vehicle using the internal combustion engine and the electric motor.

In one embodiment of the second control device of the invention, the control device may be configured to make the start determination value greater as the amount of return of the clutch pedal is smaller or as the amount of movement of the engagement member is smaller. Furthermore, in the control device, when the amount of return of the clutch pedal is a predetermined maximum value where the clutch is put in the full engagement state or when the amount of movement of the engagement member is a predetermined maximum amount of movement where the clutch is put in the full engagement state, a predetermined first value may be set as the start determination value, when the amount of return of the clutch pedal is a predetermined minimum value where the clutch is put in the full release state or when the amount of movement of the engagement member is a predetermined minimum amount of movement where the clutch is put in the full release state, a predetermined second value greater than the first value may be set as the start determination value, until the amount of return of the clutch pedal reaches a predetermined intermediate value between the minimum value and the maximum value from the maximum value, or until the amount of movement of the engagement member reaches a predetermined intermediate amount of movement between the minimum amount of movement and the maximum amount of movement from the maximum amount of movement, the start determination value may be made gradually greater from the first value to the second value as the amount of return of the clutch pedal becomes smaller or as the amount of movement of the engagement member becomes smaller such that the start determination value becomes the second value when the amount of return of the clutch pedal reaches the intermediate value or when the amount of movement of the engagement member reaches the intermediate amount of movement, and when the amount of return of the clutch pedal is between the intermediate value and the minimum value or when the amount of movement of the engagement member is between the intermediate amount of movement and the minimum amount of movement, the second value may be set as the start determination value. In this way, it is possible to suppress the start of the internal combustion engine by changing the start determination value when the amount of return of the clutch pedal is small or when the amount of movement of the engagement member is small.

In the first or second control device of the invention, the requested drive force may be calculated based on an accelerator opening.

MODES FOR CARRYING OUT THE INVENTION

First Embodiment

Figure 1:
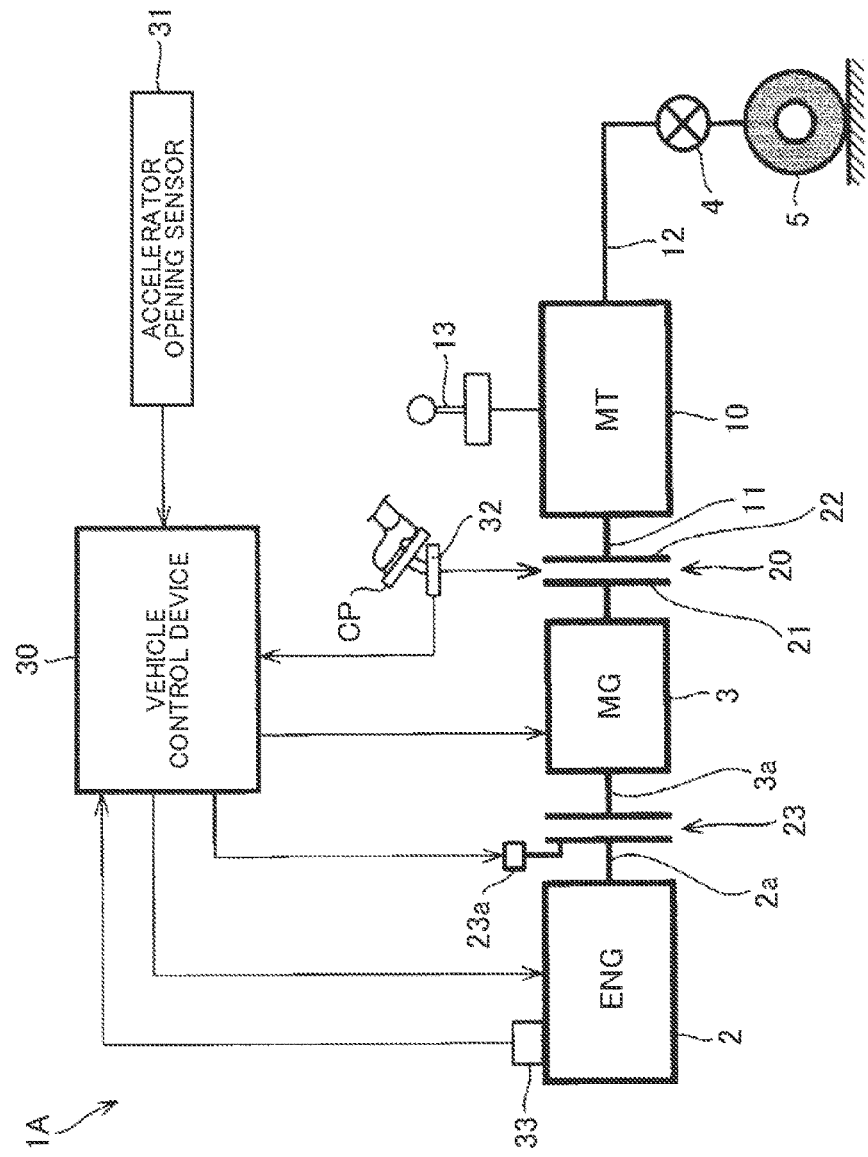
FIG. 1 is a diagram schematically showing a main part of a vehicle in which a control device according to a first embodiment of the invention is incorporated.

FIG. 1 schematically shows a main part of a vehicle in which a control device according to a first embodiment of the invention is incorporated. In a vehicle 1A, an internal combustion engine (hereinafter, referred to as an engine) 2 and a motor generator (hereinafter, referred to as MG) 3 as an electric motor are mounted as a drive source for traveling.

That is, the vehicle 1A is configured as a hybrid vehicle. The engine 2 is a known spark ignition type internal combustion engine which is mounted in a hybrid vehicle. The MG 3 is a known motor generator which is mounted in a hybrid vehicle and functions as an electric motor and a generator.

In the vehicle 1A, a manual transmission (hereinafter, abbreviated as a transmission) 10 is mounted. The transmission 10 is configured as a manual transmission having shift gear stages of forward first gear to fifth gear and reverse. The transmission 10 includes an input shaft 11 and an output shaft 12. Gear pairs (not shown) corresponding to the first gear to the fifth gear and reverse are provided between the input shaft 11 and the output shaft 12. Different transmission gear ratios are set in the gear pairs of the first gear to the fifth gear. The transmission gear ratio becomes smaller in the order of the gear pairs of the first gear, the gear pairs of the second gear, the gear pairs of the third gear, the gear pairs of the fourth gear, and the gear pairs of the fifth gear. The transmission 10 is configured such that rotation transmission by any gear pair of the gear pairs corresponding to the first gear to the fifth gear and reverse is selectively established. The transmission 10 includes a shift lever 13 which is operated by a driver. In the transmission 10, the driver operates the shift lever 13, whereby the gear pair used for rotation transmission between the input shaft 11 and the output shaft 12 is switched and the shift gear stage is switched. The transmission 10 is configured so as to be switchable to a neutral state where rotation transmission between the input shaft 11 and the output shaft 12 is cut off. When the shift lever 13 is operated to a neutral position, the transmission 10 is switched to the neutral state. The structure of the transmission 10 may be the same as a known manual transmission which is mounted in a vehicle. For this reason, detailed description thereof will be omitted.

The input shaft 11 of the transmission 10 is connected to a rotor shaft 3a of the MG 3 through a first clutch 20. The first clutch 20 is a known friction clutch. The first clutch 20 has a first engagement member 21 as an engagement member and a second engagement member 22 as an engaged member. The first engagement member 21 is connected to the rotor shaft 3a so as to be rotatable integrally. The second engagement member 22 is connected to the input shaft 11 so as to be rotatable integrally. The first engagement member 21 is provided to be movable between a full engagement position where the first engagement member 21 comes into contact with the second engagement member 22 so as to rotate integrally with the second engagement member 22 and a full release position where the first engagement member 21 is farthest separated from the second engagement member 22. The first engagement member 21 is operated by a clutch pedal CP. When the clutch pedal CP is most strongly depressed, the first engagement member 21 moves to the full release position. In this case, the first clutch 20 is put in a full release state. If the clutch pedal CP is returned gradually from the position, the first engagement member 21 moves gradually toward the full engagement position. The state of the first clutch 20 when the first engagement member 21 is not in the full release position but the first engagement member 21 is separated from the second engagement member 22 is called a release state. In the full release state and the release state, power transmission between the first engagement member 21 and the second engagement member 22 is cut off. If the clutch pedal CP is returned and the first engagement member 21 comes into contact with the second engagement member 22, the first clutch 20 is switched to a half-clutch state. The half-clutch state is a known state where power is transmitted between the first engagement member 21 and the second engagement member 22 while the first engagement member 21 and the second engagement member 22 rotate at different rotation speeds. Thereafter, when the clutch pedal CP is returned and the depression of the clutch pedal CP is released, the first engagement member 21 moves to the full engagement position. With this, the first clutch 20 is switched to the full engagement state. The relationship between the clutch pedal CP and the state of the first clutch 20 is the same as that in a known manual clutch. For this reason, detailed description thereof will be omitted.

The rotor shaft 3a of the MG 3 is connected to an output shaft 2a of the engine 2 through a second clutch 23. The second clutch 23 is also a known friction clutch. The second clutch 23 is configured so as to be switchable between an engagement state where the output shaft 2a and the rotor shaft 3a rotate integrally and a release state where the output shaft 2a is separated from the rotor shaft 3a. The second clutch 23 is provided with an actuator 23a which switches the state of the second clutch 23. In this way, the second clutch 23 is configured as an automatic clutch.

The output shaft 12 of the transmission 10 is connected to a differential mechanism 4. The differential mechanism 4 is a known mechanism which distributes input power to a right driving wheel 5 and a left driving wheel 5. In the drawing, only one driving wheel 5 is shown.

The operations of the engine 2, the MG 3, and the second clutch 23 are controlled by a vehicle control device 30. The vehicle control device 30 is configured as a computer unit including a microprocessor and peripherals, such as a RAM and a ROM, necessary for the operation of the microprocessor. The vehicle control device 30 stores various control programs for allowing the vehicle 1A to appropriately travel. The vehicle control device 30 executes the programs to perform control for control targets, such as the engine 2 and the MG 3. Various sensors which acquire information relating to the vehicle 1A are connected to the vehicle control device 30. For example, an accelerator opening sensor 31, a clutch pedal sensor 32, a crank angle sensor 33, and the like are connected to the vehicle control device 30. The accelerator opening sensor 31 outputs a signal corresponding to the amount of depression of an accelerator pedal, that is, the accelerator opening. The clutch pedal sensor 32 outputs a signal corresponding to the amount of return of the clutch pedal CP. The amount of return is the amount by which, based on position of the clutch pedal CP where the first clutch 20 is put in the full release state, the clutch pedal CP is returned from the position. For this reason, the amount of return has a minimum value when the clutch pedal CP is at a position where the first clutch 20 is put in the full release state, and has a maximum value when the clutch pedal CP is at a position where the first clutch 20 is put in the full engagement state. The crank angle sensor 33 outputs a signal corresponding to the rotation speed of the output shaft of the engine 2. In addition, although various sensors are connected to the vehicle control device 30, these are not shown. The vehicle control device 30 calculates a requested drive force based on the accelerator opening which is a driver's operation. The requested drive force may be calculated further based on a road surface gradient and a vehicle speed.

In the vehicle 1A, a plurality of traveling modes are implemented by controlling the operations of the engine 2, the MG 3, and the second clutch 23. As a plurality of traveling modes, an EV traveling mode, an engine traveling mode, and the like are set. In the EV traveling mode, the second clutch 23 is switched to the release state, and the engine 2 is stopped. Then, the vehicle 1A is allowed to travel with power of the MG 3. In the engine traveling mode, the second clutch 23 is switched to the engagement state. Then, the vehicle 1A is allowed to travel primarily with power of the engine 2. The vehicle control device 30 switches the traveling modes according to a drive force requested by the driver for the vehicle 1A. For example, when the accelerator opening is less than a predetermined determination opening set in advance, the vehicle control device 30 switches the traveling mode to the EV traveling mode. When the accelerator opening is equal to or greater than the determination opening, the vehicle control device 30 switches the traveling mode to the engine traveling mode.

When the clutch pedal CP is operated and the accelerator pedal is depressed during stopping of the vehicle such that the first clutch 20 is switched from the release state to the full engagement state, the vehicle control device 30 controls the engine 2 and the MG 3 such that power is output from at least one of the engine 2 and the MG 3. With this, the vehicle 1A is started. It is determined from which of the engine 2 and the MG 3 power is output according to the accelerator opening. At this time, when the engine 2 is stopped, the vehicle control device 30 determines the necessity of the start of the engine 2 based on the accelerator opening and the amount of depression of the clutch pedal CP, and when it is determined that the start of the engine 2 is necessary, starts the engine 2. Then, the second clutch 23 is switched to the engagement state.

Figure 2:
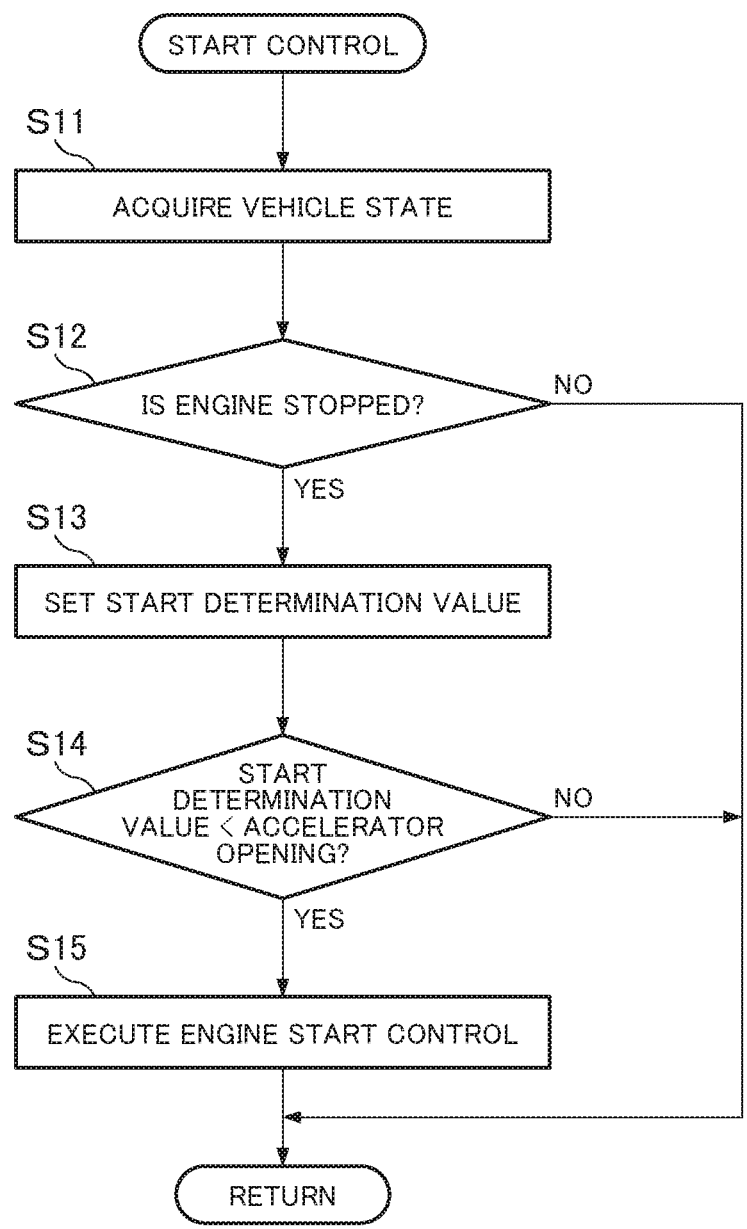
FIG. 2 is a flowchart showing a start control routine which is executed by a vehicle control device.

FIG. 2 shows a start control routine which is executed by the vehicle control device 30 in order to control the operation of the engine 2 during stopping of the vehicle in this manner. This control routine is repeatedly executed in a predetermined period during stopping of the vehicle 1A.

In this control routine, first, in Step S11, the vehicle control device 30 acquires the state of the vehicle 1A. As the state of the vehicle 1A, for example, the accelerator opening, the amount of return of the clutch pedal CP, the rotation speed of the output shaft of the engine 2, and the like are acquired. These may be acquired based on the output signals of the sensors described above. In the processing, various kinds of information relating to the state of the vehicle 1A are also acquired. Next, in Step S12, the vehicle control device 30 determines whether or not the engine 2 is stopped. The determination may be performed based on the rotation speed of the output shaft 2a of the engine 2. When it is determined that the engine 2 is in operation, this control routine ends.

Figure 3:
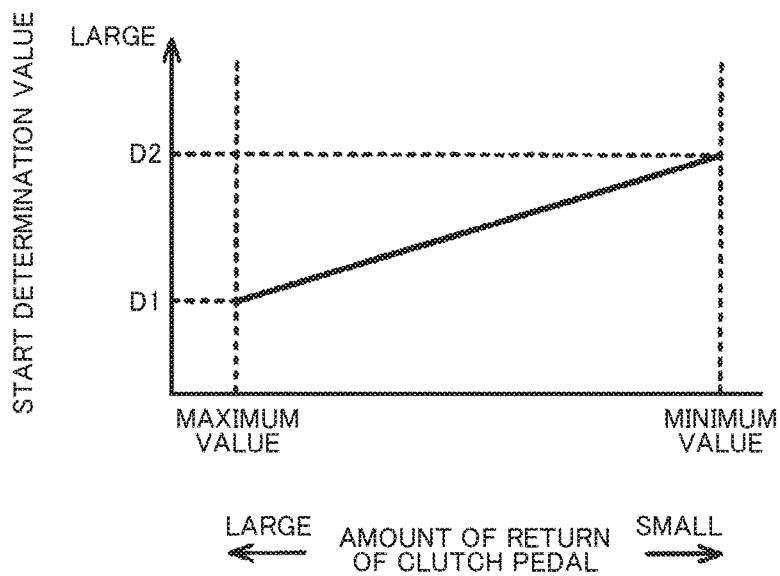
FIG. 3 is a diagram showing an example of the relationship between the amount of return of a clutch pedal and a start determination value.

When it is determined that the engine 2 is stopped, the process progresses to Step S13, and the vehicle control device 30 sets a start determination value based on the amount of return of the clutch pedal CP. The start determination value is a value which is set as a determination reference for determining the necessity of the start of the engine 2. The start determination value is compared with the accelerator opening to determine the necessity of the start of the engine 2. For this reason, the start determination value is set to 0% to 100%, that is, numerical values representing the accelerator opening of 0 to a full open state. FIG. 3 shows the relationship between the amount of return of the clutch pedal CP and the start determination value. As shown in the drawing, when the amount of return of the clutch pedal CP is the maximum value where the first clutch 20 is put in the full engagement state, a first determination value D1 is set as the start determination value. When the amount of return of the clutch pedal CP is the minimum value where the first clutch 20 is put in the full release state, a second determination value D2 is set as the start determination value. As shown in the drawing, a value representing the accelerator opening of 30% to 40% is set as the first determination value D1. As shown in the drawing, a value greater than the first determination value D1 is set as the second determination value D2. However, a value representing the accelerator opening of lower than 100% is set as the second determination value D2. As shown in the drawing, a greater value is set as the start determination value as the amount of return of the clutch pedal CP is smaller. The relationship shown in the drawing may be obtained by an experiment, numerical calculation, or the like and may be stored in the ROM of the vehicle control device 30 in the form of a map.

Next, in Step S14, the vehicle control device 30 determines whether or not the accelerator opening is greater than the start determination value. When it is determined that the accelerator opening is equal to or less than the start determination value, this control routine ends. When it is determined that the accelerator opening is greater than the start determination value, the process progresses to Step S15, and the vehicle control device 30 executes engine start control. In the engine start control, a start motor (not shown) in the engine 2 is controlled to start the engine 2. Thereafter, this control routine ends. With the determination regarding the start of the engine 2 in this manner, the start determination value corresponds to a predetermined value of the invention.

In the control device of the first embodiment, as the amount of return of the clutch pedal CP is smaller, the start determination value is greater. In this case, when the amount of return of the clutch pedal CP is small, the engine 2 is hard to be started compared to a case where the amount of return of the clutch pedal CP is great. For this reason, even when the driver depresses the accelerator pedal erroneously even with the small amount of return of the clutch pedal CP, it is possible to suppress the start of the engine 2. Accordingly, it is possible to suppress the unnecessary start of the engine 2 at the time of the start of the vehicle 1A. With this, it is possible to suppress deterioration of fuel efficiency. Furthermore, since it is possible to suppress the unnecessary start of the engine 2, that is, the start of the engine 2 unintended by the driver, it is possible to suppress an unpleasant feeling to the driver due to starting sound of the engine 2 or vibration at the time of the start. When the driver strongly depresses the accelerator pedal in order to rapidly start the vehicle 1A, the engine 2 is started. For this reason, it is possible to start the vehicle 1A using the engine 2 and the MG 3.

Figure 4:
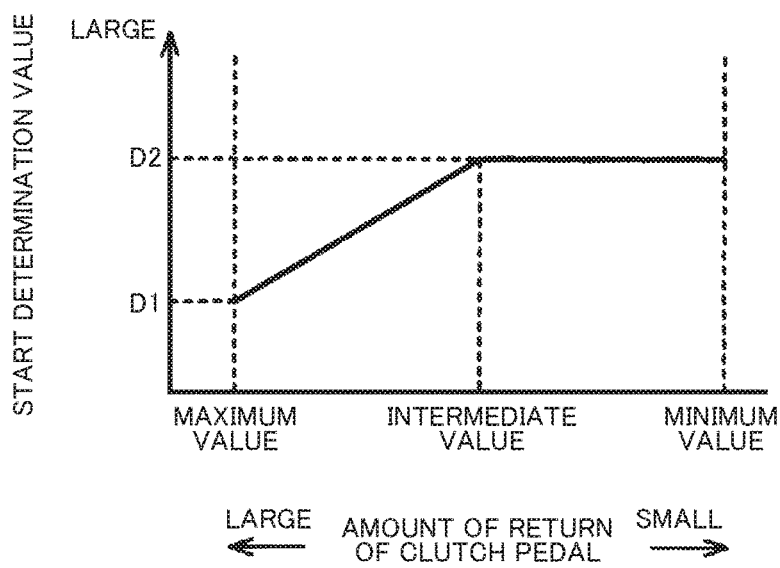
FIG. 4 is a diagram showing another example of the relationship between the amount of return of a clutch pedal and a start determination value.

A map which is used when setting the start determination value is not limited to the map shown in FIG. 3. For example, a map shown in FIG. 4 may be used. In FIG. 4, the parts common to FIG. 3 are represented by the same reference numerals, and description thereof will not be repeated. In the map shown in the drawing, until the amount of return of the clutch pedal CP reaches a predetermined intermediate value from the maximum value, as the amount of return of the clutch pedal CP becomes smaller, the start determination value is increased gradually from the first determination value D1 to the second determination value D2. Then, the second determination value D2 is set between the intermediate value and the minimum value. An appropriate value between the minimum value and the maximum value is set as the intermediate value. For this reason, the first determination value D1 corresponds to a first value of the invention, and the second determination value D2 corresponds to a second value of the invention.

Even when the start determination value is set based on this map, when the amount of return of the clutch pedal CP is small, the engine 2 is hard to be started compared to a case where the amount of return of the clutch pedal CP is great.

For this reason, it is possible to suppress the unnecessary start of the engine 2 at the time of the start of the vehicle 1A.

Second Embodiment

Figure 5:
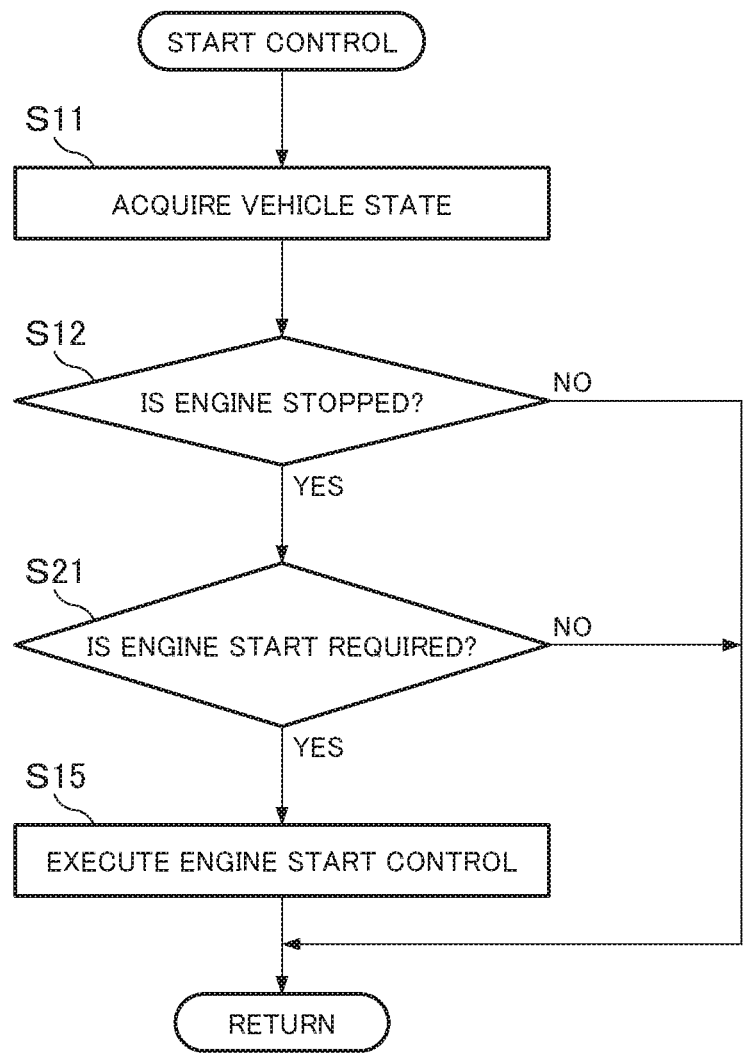
FIG. 5 is a flowchart showing a start control routine which is executed by a vehicle control device in a control device according to a second embodiment of the invention.

Next, a control device according to a second embodiment of the invention will be described referring to FIGS. 5 to 7. In this embodiment, FIG. 1 is also referred to with regard to the vehicle 1A. FIG. 5 shows a start control routine which is executed by a vehicle control device 30 in this embodiment. This control routine is repeatedly executed in a predetermined period during stopping of the vehicle 1A. In FIG. 5, the steps common to FIG. 2 are represented by the common reference numerals, and description thereof will not be repeated.

In the control routine of FIG. 5, the vehicle control device 30 advances processing to Step S12 similarly to the control routine of FIG. 2. In Step S12, when it is determined that the engine 2 is stopped, the process progresses to Step S21, and the vehicle control device 30 determines whether or not the start of the engine 2 is necessary based on the amount of return of the clutch pedal CP and the accelerator opening. FIG. 6 shows a map in which the amount of return of the clutch pedal CP and the accelerator opening are associated with the necessity of the start of the engine 2. As shown in the drawing, the entire map is divided into a start region A1 where the start of the engine 2 is necessary and a stop region A2 where the start of the engine 2 is unnecessary by a determination line L. For this reason, the start region A1 and the stop region A2 do not overlap each other. As shown in the drawing, the start region A1 is provided so as to be narrower as the amount of return of the clutch pedal CP becomes smaller. For this reason, the stop region A2 becomes wider as the amount of return of the clutch pedal CP becomes smaller. The necessity of the start of the engine 2 is determined according to the position of a point specified by the amount of return of the clutch pedal CP and the accelerator opening on the map. When the point is in the start region A1, it is determined that the start of the engine 2 is necessary, and when the point is in the stop region A2, it is determined that the start of the engine 2 is unnecessary. The determination line L is included in the stop region A2. For this reason, when the point is on the determination line L, it is determined that the start of the engine 2 is unnecessary. The map may be obtained by, for example, an experiment, numerical calculation, or the like and may be stored in the ROM of the vehicle control device 30.

When it is determined that the start of the engine 2 is unnecessary, this control routine ends. When it is determined that the start of the engine 2 is necessary, the process progresses to Step S15, and the vehicle control device 30 executes the engine start control. Thereafter, this control routine ends.

Figure 6:
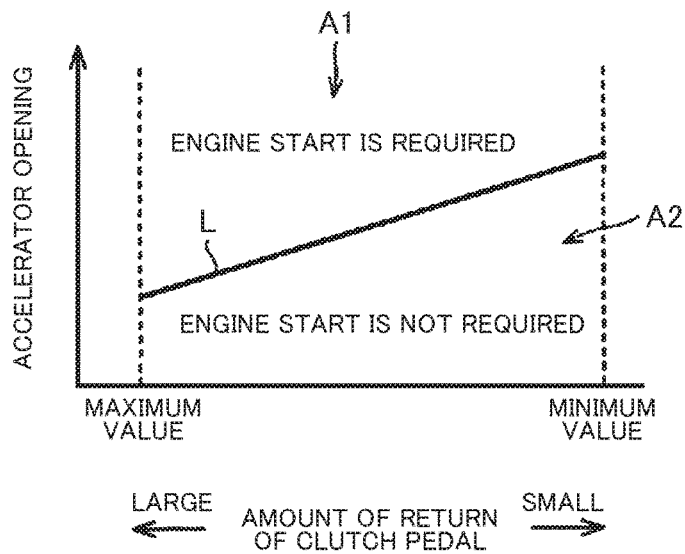
FIG. 6 is a diagram showing an example of a map in which the amount of return of a clutch pedal and an accelerator opening are associated with the necessity of the start of an engine.
Figure 7:
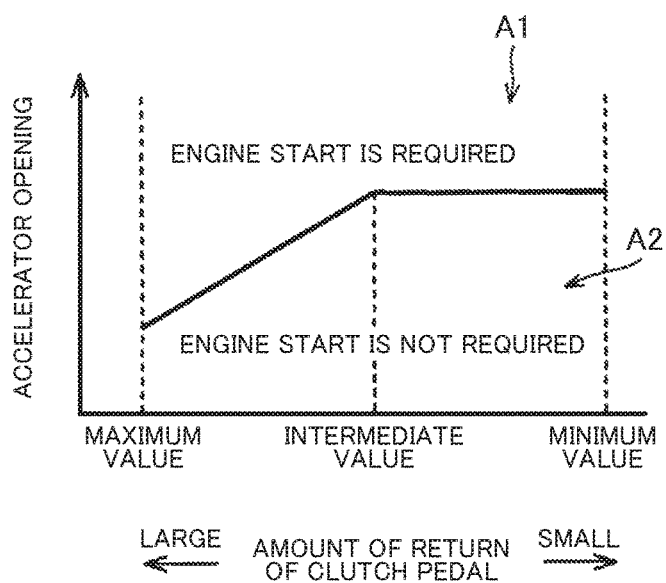
FIG. 7 is a diagram showing another example of a map in which the amount of return of a clutch pedal and an accelerator opening are associated with the necessity of the start of an engine.

In this embodiment, the necessity of the start of the engine 2 at the time of the start of the vehicle 1 is determined using a map shown in FIG. 6. In the map, the start region A1 becomes narrower as the amount of return of the clutch pedal CP becomes smaller. For this reason, when the amount of return of the clutch pedal CP is small, the engine 2 is hard to be started compared to a case where the amount of return of the clutch pedal CP is great. Accordingly, as in the first embodiment, it is possible to suppress the unnecessary start of the engine 2 at the time of the start of the vehicle 1A. With this, it is possible to suppress deterioration of fuel efficiency. Furthermore, it is possible to suppress an unpleasant feeling to the driver due to starting sound of the engine 2 or vibration at the time of the start. On the other hand, when the driver strongly depresses the accelerator pedal intentionally, the engine 2 can be started.

The map which is used to determine the necessity of the start of the engine 2 in the second embodiment is not limited to the map shown in FIG. 6. The necessity of the start of the engine 2 may be determined using a map shown in FIG. 7. In FIG. 7, the parts common to the FIG. 6 are represented by the same reference numerals, and description will not be repeated. In the map, the determination line L is provided such that, until the amount of return of the clutch pedal CP reaches a predetermined intermediate value from the maximum value, the start region A1 becomes narrower gradually as the amount of return of the clutch pedal CP becomes smaller. Furthermore, in the map, the determination line L is provided such that, until the amount of return of the clutch pedal CP becomes the minimum value from the intermediate value, the ratio of the start region A1 and the stop region A2 is not changed.

Even when the necessity of the start of the engine 2 is determined using the map, when the amount of return of the clutch pedal CP is small, the engine 2 is hard to be started compared to a case where the amount of return of the clutch pedal CP is great. For this reason, it is possible to suppress the unnecessary start of the engine 2 at the time of the start of the vehicle 1A. Furthermore, it is possible to suppress an unpleasant feeling to the driver due to starting sound of the engine 2 or vibration at the time of the start. On the other hand, when the driver strongly depresses the accelerator pedal intentionally, the engine 2 can be started.

Figure 8:
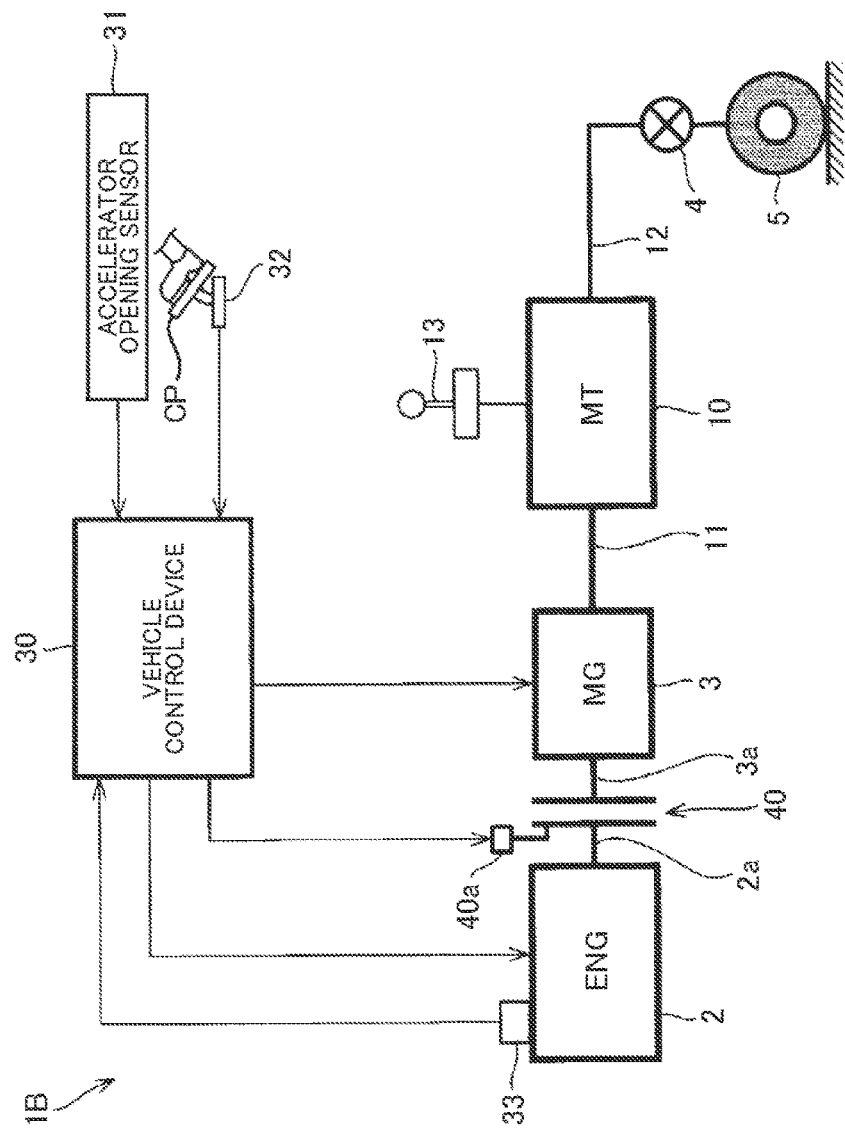
FIG. 8 is a diagram schematically showing a main part of another vehicle to which a control device of the invention is applied.

A hybrid vehicle to which the invention is applied is not limited to the vehicle shown in FIG. 1. For example, the invention may be applied to a vehicle 1B shown in FIG. 8. In FIG. 8, the parts common to FIG. 1 are represented by the same reference numerals, and description thereof will not be repeated. As shown in the drawing, in the vehicle 1B, the rotor shaft 3a of the MG 3 is coupled directly to the input shaft 11 of the transmission 10. Instead of the second clutch 23, a clutch 40 is provided. Similarly to the second clutch 23, the clutch 40 is configured as an automatic clutch whose state is switched by an actuator 40a.

In the vehicle 1B, a clutch pedal CP is also provided. However, the clutch pedal CP is not mechanically connected to the clutch 40. A vehicle control device 30 controls the actuator 40a according to an output signal of a clutch pedal sensor 32. For this reason, the clutch 40 is also operated by a depression operation of the clutch pedal CP. However, the vehicle control device 30 executes a plurality of control routines for controlling the clutch 40, and also controls the clutch 40 based on the control routines. That is, the clutch 40 is operated by both the control routines which are executed by the vehicle control device 30 and the clutch pedal CP.

In the vehicle 1B, the driver also operates the clutch pedal CP at the time of the start of the vehicle 1B. For this reason, with the application of the invention, it is possible to suppress the unnecessary start of the engine 2 at the time of the start of the vehicle 1B. With this, it is possible to suppress deterioration of fuel efficiency.

In this way, the invention can be applied to various vehicles in which a driver's clutch operation is necessary at the time of the start, and the engine 2 can be separated from the driving wheel 5 regardless of the driver's operation to allow traveling only using the MG 3.

In the respective embodiments described above, the MG 3 corresponds to an electric motor of the invention. The first clutch 20 and the clutch 40 correspond to a clutch of the invention. By the execution of the control routine of FIG. 2, the vehicle control device 30 functions as internal combustion engine start means of the invention. By the execution of Step S13 of FIG. 2, the vehicle control device 30 functions as determination value setting means of the invention, and by the execution of Step S14 of FIG. 2, the vehicle control device 30 functions as determination means of the invention. By the execution of Steps S13, S14 of FIG. 2 or Step S21 of FIG. 5, the vehicle control device 30 functions as start necessity determination means of the invention. By the execution of Step S15 of FIG. 2, the vehicle control device 30 functions as start means of the invention. By the storage of the map of FIG. 6 or the map of FIG. 7, the vehicle control device 30 functions as storage means of the invention.

The invention is not limited to the respective embodiments described above, and can be carried out in various forms. For example, a transmission of a vehicle to which the invention is applied is not limited to a transmission in which the highest forward gear stage is a fifth gear. The highest forward gear stage of the transmission may be a third gear, a fourth gear, or a sixth gear or more. A hybrid vehicle to which the invention is applied may be provided with an electric motor, instead of a motor generator.

Figure 9:
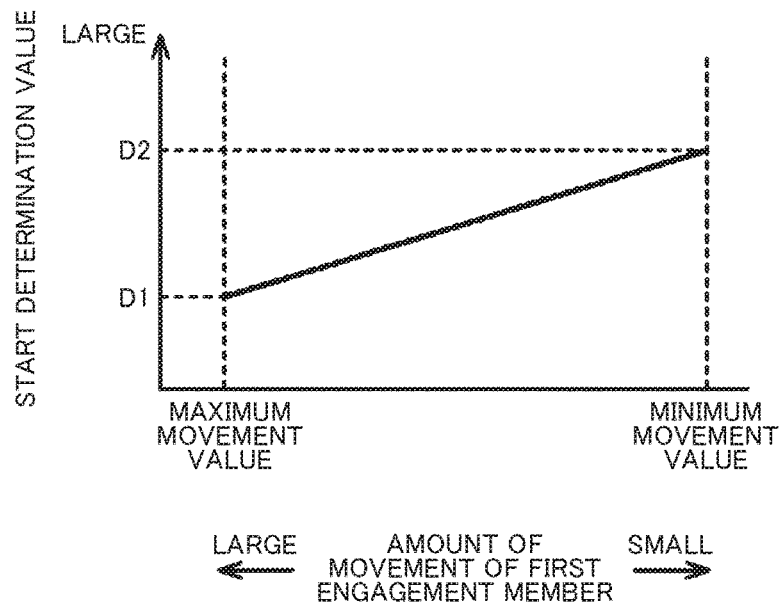
FIG. 9 is a diagram showing an example of the relationship between the amount of movement of a first engagement member and a start determination value.
Figure 10:
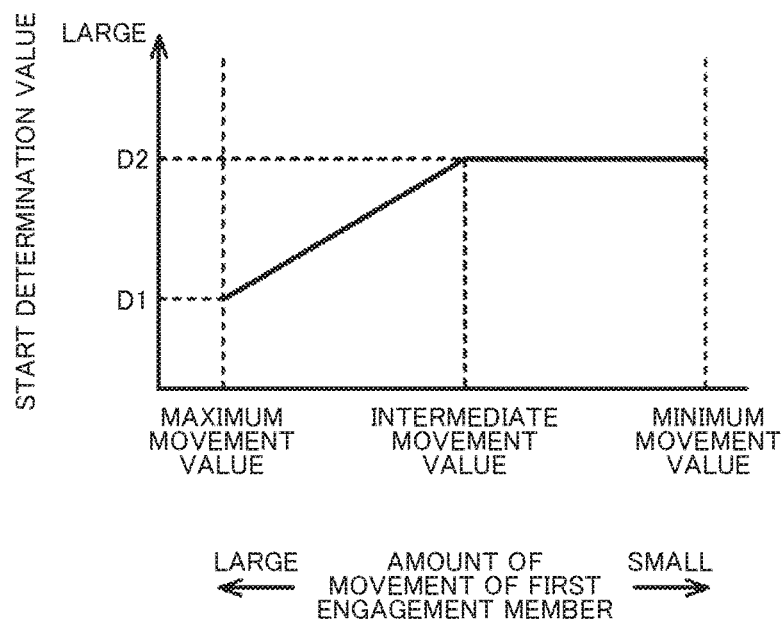
FIG. 10 is a diagram showing another example of the relationship between the amount of movement of a first engagement member and a start determination value.
Figure 11:
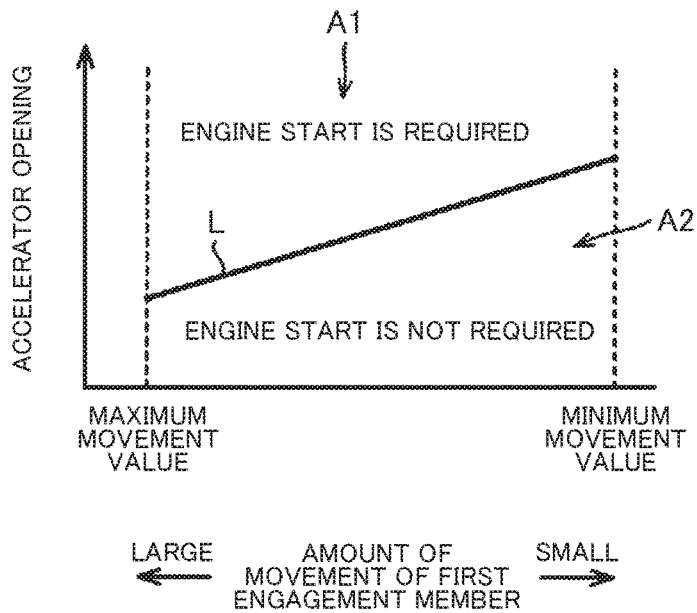
FIG. 11 is a diagram showing an example of a map in which the amount of movement of a first engagement member and an accelerator opening are associated with the necessity of the start of an engine.
Figure 12:
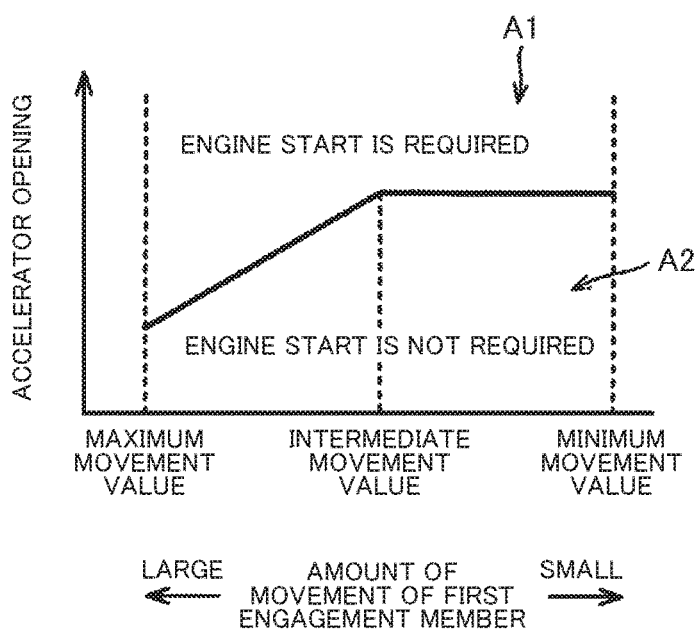
FIG. 12 is a diagram showing another example of a map in which the amount of movement of a first engagement member and an accelerator opening are associated with the necessity of the start of an engine.

In the respective embodiments described above, although the necessity of the start of the engine is determined by the amount of return of the clutch pedal, the necessity of the start of the engine may be determined based on the amount of movement of the first engagement member, instead of the amount of return. The amount of movement of the first engagement member is the amount of movement of the first engagement member moving from the full release position toward the full engagement position. For this reason, when the first engagement member is in the full release position, the amount of movement becomes minimum, and when the first engagement member is in the full engagement position, the amount of movement becomes maximum. That is, when the amount of return of the clutch pedal is the minimum value, the amount of movement becomes minimum, and when the amount of return is the maximum value, the amount of movement becomes maximum. In this case, the clutch may be provided with a sensor which outputs a signal corresponding to the amount of movement of the first engagement member, and the output signal of the sensor may be referred to. When using the amount of movement of the first engagement member, a map of FIG. 9 is used instead of the map of FIG. 3, and a map of FIG. 10 is used instead of the map of FIG. 4. Furthermore, a map of FIG. 11 is used instead of the map of FIG. 6, and a map of FIG. 12 is used instead of the map of FIG. 7. As will be apparent from the drawings, when the amount of movement of the first engagement member is small, the internal combustion engine is hard to be started compared to a case where the amount of movement of the first engagement member is great. When the clutch pedal is mechanically connected to the clutch, the amount of movement of the first engagement member and the amount of return of the clutch pedal have a correspondence relationship. For this reason, even when the necessity of the start is determined based on the amount of movement of the first engagement member, it is possible to obtain the same functional effects as in the above-described embodiments. In the above-described embodiments, although it is determined whether or not to start the internal combustion engine using the accelerator opening, it may be determined whether or not to start the internal combustion engine using the requested drive force instead of the accelerator opening. For example, when the requested drive force is equal to or greater than a predetermined start determination value, start control may be performed so as to start the internal combustion engine.

In the first embodiment described above, the clutch provided between the engine and the MG is not limited to a friction clutch. For example, various clutches, such as an electromagnetic clutch, can be used as long as the clutches can couple or uncouple the engine and the MG. In the invention, although the necessity of the start of the engine 2 is determined by comparing the start determination value and the accelerator opening, when the vehicle 1A is stopped and the engine 2 is stopped, and when the amount of return of the clutch pedal from the position of the clutch pedal where the clutch is put in the full release state is smaller than a predetermined value or when the amount of movement of the engagement member moving from a position where the clutch is put in the full release state toward a position where the clutch is put in the full engagement state is smaller than a predetermined value, the internal combustion engine is not started even when the accelerator opening is the start determination value. In this form, even when the driver depresses the accelerator pedal erroneously even with the amount of return of the clutch pedal smaller then the predetermined value or the amount of movement of the engagement member smaller than the predetermined value, it is possible to suppress the start of the internal combustion engine. For this reason, it is possible to suppress the unnecessary start of the internal combustion engine at the time of the start of the vehicle. With this, it is possible to suppress deterioration of fuel efficiency. The predetermined value is a value until the clutch is put in a half-engagement state from the full release state, and the predetermined value may be a value where the clutch is put in the half-engagement state.

The invention claimed is:

1. A control device for a hybrid vehicle, the hybrid vehicle including
an internal combustion engine as a drive source for traveling,
an electric motor as a drive source for traveling,
a driving wheel, and
a clutch including an engagement member, an engaged member, and a clutch pedal, the engagement member and the engaged member being provided in a power transmission path between the internal combustion engine and the driving wheel, the clutch being configured to change a position of the engagement member with respect to the engaged member according to a depression operation of the clutch pedal to be switchable between a full engagement state and a full release state, the full engagement state being a state where i) the engagement member and the engaged member rotate integrally and ii) power is transmitted between the internal combustion engine and the driving wheel, and the full release state being a state where i) the engagement member is farthest separated from the engaged member and ii) power transmission between the internal combustion engine and the driving wheel is cut off,
the hybrid vehicle being configured to separate the internal combustion engine from the driving wheel to drive the driving wheel with the electric motor, the control device comprising:
a vehicle control device configured to
a) calculate a requested drive force based on a driver's operation, b) start the internal combustion engine when the requested drive force is equal to or greater than a start determination value, and c) i) when the hybrid vehicle is stopped, the internal combustion engine is stopped and an amount of return of the clutch pedal from the position of the clutch pedal where the clutch is put in the full release state is smaller than a predetermined value, or ii) when the hybrid vehicle is stopped, the internal combustion engine is stopped and an amount of movement of the engagement member moving from a position where the clutch is put in the full release state toward a position where the clutch is put in the full engagement state is smaller than a predetermined value, inhibit the start of the internal combustion engine even when the requested drive force is the start determination value.

2. The control device according to claim 1,
wherein the vehicle control device is configured to calculate the requested drive force based on an accelerator opening.

3. A control device for a hybrid vehicle, the hybrid vehicle including
an internal combustion engine as a drive source for traveling,
an electric motor as a drive source for traveling,
a driving wheel, and
a clutch including an engagement member, an engaged member, and a clutch pedal, the engagement member and the engaged member being provided in a power transmission path between the internal combustion engine and the driving wheel, the clutch being configured to change a position of the engagement member with respect to the engaged member according to a depression operation of the clutch pedal to be switchable between a full engagement state and a full release state, the full engagement state being a state where i) the engagement member and the engaged member rotate integrally and ii) power is transmitted between the internal combustion engine and the driving wheel, and the full release state being a state where i) the engagement member is farthest separated from the engaged member and ii) power transmission between the internal combustion engine and the driving wheel is cut off,
the hybrid vehicle being configured to separate the internal combustion engine from the driving wheel to drive the driving wheel with the electric motor, the control device comprising:
a vehicle control device configured to
a) calculate a requested drive force based on a driver's operation,
b) start the internal combustion engine when the requested drive force is equal to or greater than a start determination value, and
c) i) when the hybrid vehicle is stopped, the internal combustion engine is stopped and an amount of return of the clutch pedal from the position of the clutch pedal where the clutch is put in the full release state is small, make the start determination value greater than when the amount of return of the clutch pedal is great, or
ii) when the hybrid vehicle is stopped, the internal combustion engine is stopped and an amount of movement of the engagement member moving from a position where the clutch is put in the full release state toward a position where the clutch is put in the full engagement state is small, make the start determination value greater than when the amount of movement of the engagement member is great.

4. The control device according to claim 3,
wherein the vehicle control device is configured to make the start determination value greater as the amount of return of the clutch pedal is smaller or to make the start determination value greater as the amount of movement of the engagement member is smaller.

5. The control device according to claim 3,
wherein the vehicle control device is configured to
a) when the amount of return of the clutch pedal is a predetermined maximum value where the clutch is put in the full engagement state, set a predetermined first value as the start determination value, or
when the amount of movement of the engagement member is a predetermined maximum amount of movement where the clutch is put in the full engagement state, set the predetermined first value as the start determination value,
b) when the amount of return of the clutch pedal is a predetermined minimum value where the clutch is put in the full release state, set a predetermined second value greater than the first value as the start determination value, or
when the amount of movement of the engagement member is a predetermined minimum amount of movement where the clutch is put in the full release state, set the predetermined second value greater than the first value as the start determination value,
c) until the amount of return of the clutch pedal reaches a predetermined intermediate value between the minimum value and the maximum value from the maximum value, make the start determination value gradually greater from the first value to the second value as the amount of return of the clutch pedal becomes smaller such that the start determination value becomes the second value when the amount of return of the clutch pedal reaches the intermediate value, or
until the amount of movement of the engagement member reaches a predetermined intermediate amount of movement between the minimum amount of movement and the maximum amount of movement from the maximum amount of movement, make the start determination value gradually greater from the first value to the second value as the amount of movement of the engagement member becomes smaller such that the start determination value becomes the second value when the amount of movement of the engagement member reaches the intermediate amount of movement, and
d) when the amount of return of the clutch pedal is between the intermediate value and the minimum value, set the second value as the start determination value, or
when the amount of movement of the engagement member is between the intermediate amount of movement and the minimum amount of movement, set the second value as the start determination value.

6. The control device according to claim 3,
wherein the vehicle control device is configured to calculate the requested drive force based on an accelerator opening.

* * * * *